US006682152B2

(12) United States Patent
Melgarejo et al.

(10) Patent No.: US 6,682,152 B2
(45) Date of Patent: Jan. 27, 2004

(54) SECURE WHEEL LOCKING SYSTEM

(75) Inventors: Mauricio Melgarejo, Simi Valley, CA (US); Alejandro Melgarejo, Simi Valley, CA (US)

(73) Assignee: Freedom Designs Incorporated, Simi Valley, CA (US)

( * ) Notice: Subject to any disclaimer, the term of this patent is extended or adjusted under 35 U.S.C. 154(b) by 144 days.

(21) Appl. No.: 09/963,321

(22) Filed: Sep. 25, 2001

(65) Prior Publication Data
US 2002/0036427 A1 Mar. 28, 2002

Related U.S. Application Data
(60) Provisional application No. 60/235,046, filed on Sep. 25, 2000.

(51) Int. Cl.[7] .............................................. B60B 35/00
(52) U.S. Cl. .............................. 301/111.06; 301/111.01; 301/121
(58) Field of Search ............................ 301/111.01, 112, 301/113, 118, 119, 120, 121, 122, 111.03, 111.04, 111.05, 111.06, 111.07, 124.2, 128, 125

(56) References Cited
U.S. PATENT DOCUMENTS

| | | | | |
|---|---|---|---|---|
| 2,323,813 A | * | 7/1943 | Fred | |
| 4,392,690 A | * | 7/1983 | Anderson | 301/121 |
| 4,679,862 A | * | 7/1987 | Luo | 301/112 |
| 5,121,808 A | * | 6/1992 | Visentini et al. | 180/155 |
| 5,188,430 A | * | 2/1993 | Chiu | 301/111.01 |
| 6,152,541 A | * | 11/2000 | Huber | 301/124.2 |

* cited by examiner

Primary Examiner—Russell D. Stormer
(74) Attorney, Agent, or Firm—Oppenheimer, Wolff & Donnelly LLP

(57) ABSTRACT

A wheelchair wheel locking system reduces the likelihood that a wheel will inadvertently disengage from the wheelchair. An axle is attached to the wheel and has a protrusion for engaging annular grooves within a wall forming an inner passage through an axle receptor attached to the wheelchair. The axle is inserted in an axial direction into the inner passage and has a first locked position in which the axle is fully engaged with the axle receptor, and a second locked position in which the axle is partially engaged with the axle receptor. If a quick release lock is inadvertently released by, for example, pressing a release button, the protrusion retracts and disengages from a first annular groove within the wall of the axle receptor, the axle may start to move axially relative to the axle receptor to a position in which the wheel will disengage from the wheelchair. However, when the axle reaches the partially engaged position, the protrusion will engage a second annular groove within the wall of the receptor thereby locking the axle into a second locked position relative to the axle receptor thereby preventing the wheel from disengaging from the wheelchair.

6 Claims, 6 Drawing Sheets

SECURE WHEEL LOCKING SYSTEM

This application claims priority to U.S. Provisional Patent Application 60/235,046 filed on Sep. 25, 2000 which is hereby incorporated by reference in its entirety into the present disclosure.

BACKGROUND OF THE INVENTION

A. Field of the Invention

The present invention relates to systems for locking a wheel to a frame and, in particular, to a locking system for locking a wheel onto a wheelchair B. Related Art A typical wheelchair includes a frame onto which front and rear wheelchair wheels attach. In older wheelchair designs, the wheels have been fixedly attached to the wheelchair frame, and tools such as wrenches have been required to remove the wheel from the frame. More recent designs include a quick-release mechanism to permit convenient removal of the wheel from the frame.

One quick release design provides the user with a button on the outside of the wheel. To release the wheel from the frame, the user pushes the button to release a lock. While the user depresses the button, he or she can pull the wheel from the frame.

A problem with the push-and-remove type of wheel is that wheelchairs often bump into walls and other objects during use. It is possible for the button to be pushed inadvertently by, for example, the wheel bumping into a wall. The wheel can then become disengaged from the chair by accident.

INVENTION SUMMARY

The present invention relates to a wheelchair locking system that reduces the likelihood that a wheel will accidentally disengage from the wheelchair.

In one embodiment of the invention, a multi-stage wheel lock is provided. In a first locked position, the wheel is fully locked to the wheelchair frame. In a second locked position, the wheel is moved from the initial locked position, but remains locked to the wheelchair frame. The wheel may have two, three or more locked positions.

In another embodiment of the invention, a wheelchair wheel has an axle. The axle is provided with a ball bearing lock. The axle extends through an axle receptor associated with the wheelchair frame. The ball bearings engage with or against a portion of the axle receptor. When the ball bearing lock is initially released, the axle may be partially removed from the axle receptor. However, the ball bearings again engage with a portion of the axle receptor to lock the wheel onto the wheelchair frame in a second locked position. When the ball bearing lock is again released, the axle may be disengaged from the axle receptor entirely.

In another embodiment of the invention, the wheelchair wheel has an axle that is provided with a quick release lock with a push button release. In the initial locked position, the axle is fully locked to the wheelchair frame. If the push button release is pushed briefly, the axle may partially disengage from the frame, but locks into a second locked position before becoming fully disengaged from the frame. The push button must be pushed again to disengage the axle from the second locked position. This two-stage lock prevents accidental disengagement of the wheel when, for example, the wheel bumps up against a wall or other surface. In a further embodiment, the user may release the axle from the initial locked position without the axle become locked in the second locked position by continuing to push the release button as the wheel is being removed from the wheelchair.

These and other aspects of the invention will become apparent from a review of the specification, drawings and claims.

IV. DETAILED DESCRIPTION OF A PREFERRED EMBODIMENT

Figure 1:
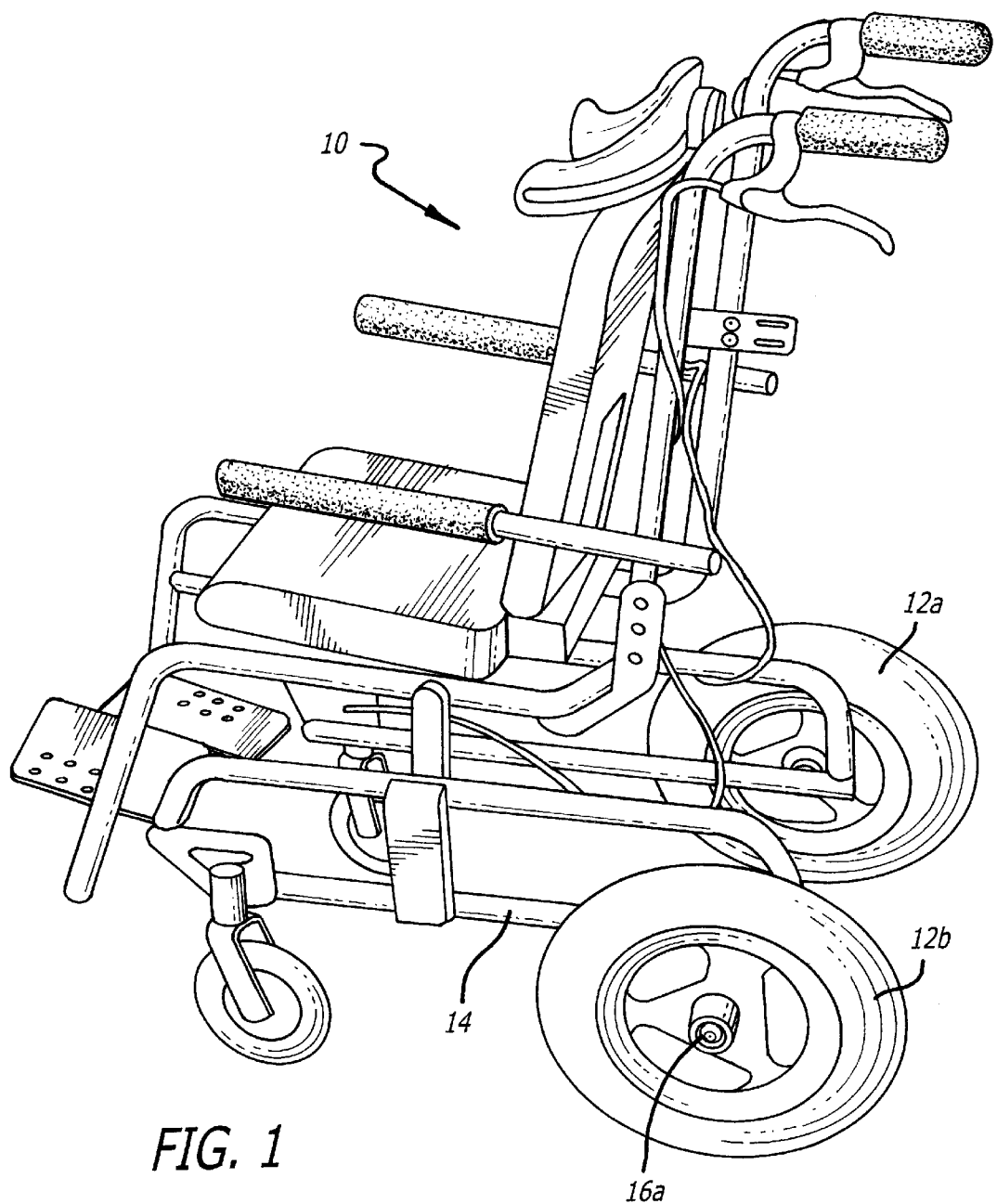
FIG. 1 is a perspective view of a wheelchair having removable rear wheels.
Figure 2:
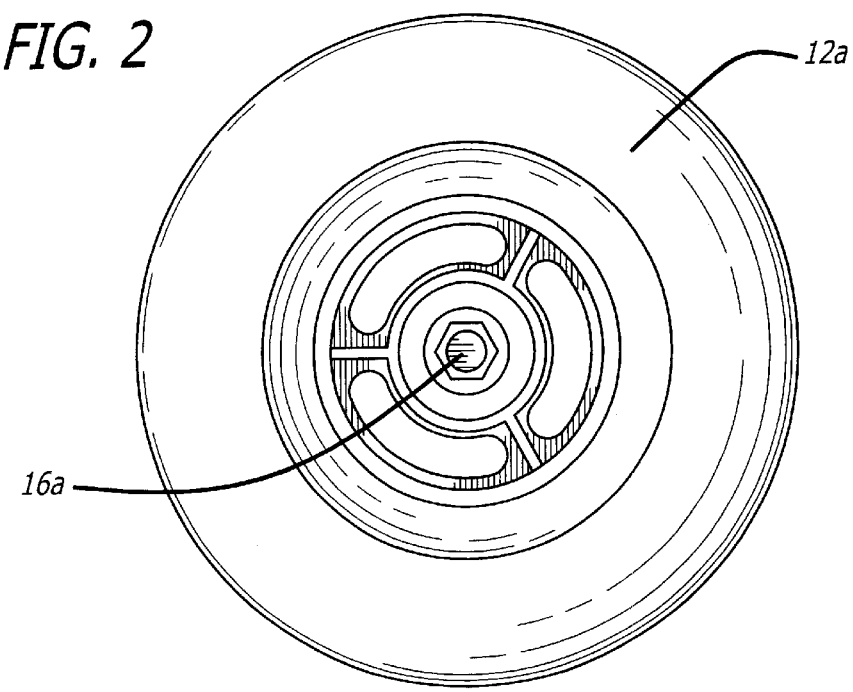
FIG. 2 is an exterior side view of a wheel having a push-button wheel release.
Figure 3:
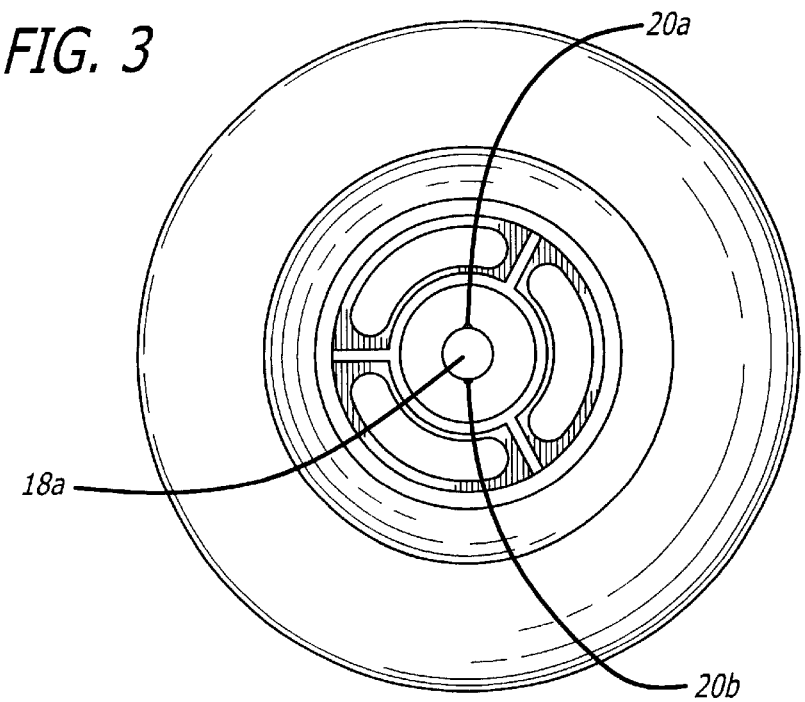
FIG. 3 is an interior side view of the wheel of FIG. 2.

FIG. 1 illustrates a wheelchair 10 having rear wheels 12a and 12b. The rear wheels 12a and 12b are mounted on a wheelchair frame 14. The wheels are of a quick-release type, with respective quick release buttons which, when depressed, permit a user to remove the respective wheels. One quick release button is shown in FIG. 1. A respective quick release button 16b (not shown) is associated with wheel 12b. FIG. 2 illustrates the exterior of the wheel 12a, while FIG. 3 illustrates the interior of the same wheel. An axle 18a extends from the wheel 12a, and the wheel 12a rotates about the axle 18a. Two protrusions 20a and 20b, typically ball bearings, extend from near the end of the axle 18a.

The axle may be of the type available from AVIBANK MANUFACTURING, INC. of North Hollywood, Calif. under the trade name Ball-Lok®, which describes a line of spring-loaded detent pin products. The user presses a button to retract two spring-loaded detent pins that are normally biased to protrude from the sides of an axle shaft. When the detent pins are extended and protrude from the shaft, the pins can engage with corresponding openings, channels or grooves in an associated shaft receptor, to lock the shaft to the shaft receptor. To disengage the shaft, the user pushes a button to retract the pins, thereby releasing the lock between the shaft and the shaft receptor. The detent pins are ball bearings in the embodiment that is illustrated in the drawings, but can alternatively be other types of pins or protrusions.

Figure 4:
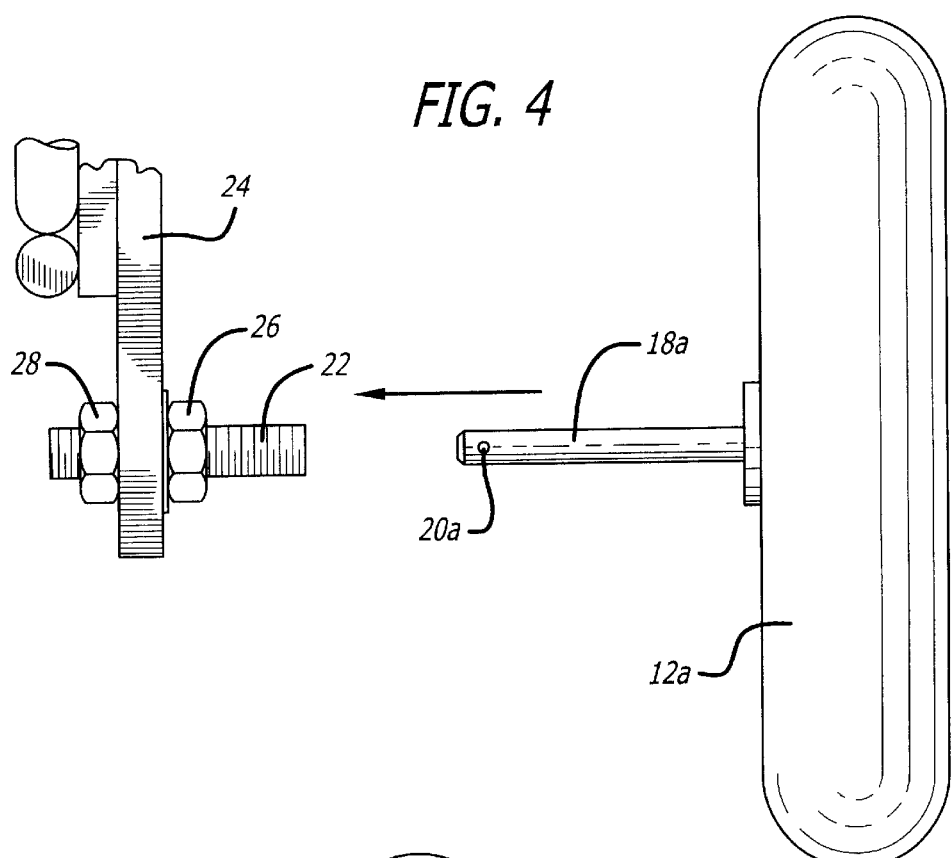
FIG. 4 illustrates the wheel of FIGS. 2 and 3 as the axle is being inserted into an axle receptor.

FIG. 4 illustrates the axle 18a of an embodiment of the present invention with retractable detent pins 20a and 20b (FIG. 6) extending from the sides of the axle. The axle may be inserted into an axle receptor 22 that extends from a portion of the wheelchair frame 24. In the embodiment of FIG. 4, the nuts 26 and 28 secure the axle receptor 22 to the frame 24.

Figure 5:
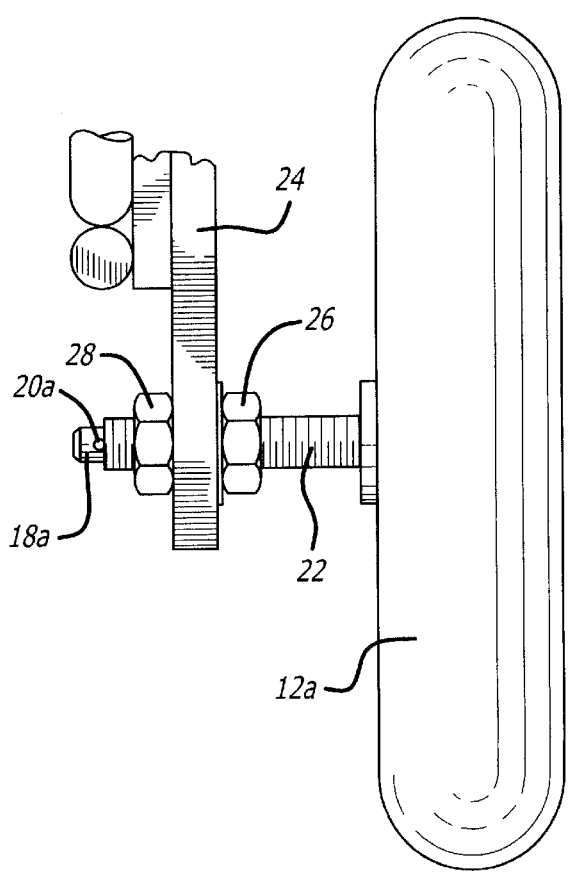
FIG. 5 illustrates the wheel of FIG. 4 as it appears locked onto the axle receptor.
Figure 6:
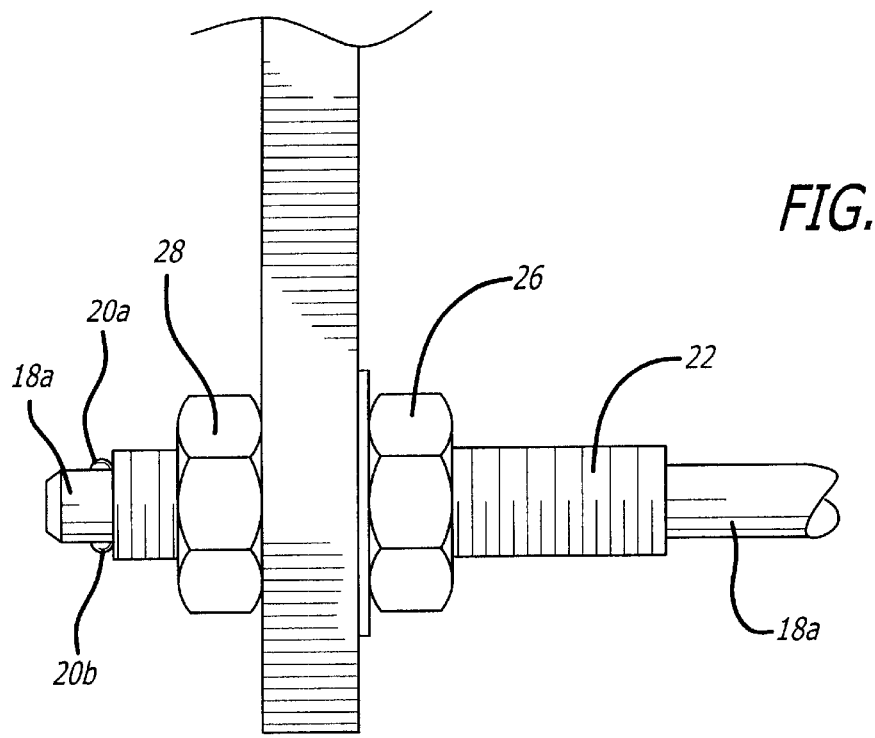
FIG. 6 illustrates the locked position of FIG. 5 in detail.

FIG. 5 and FIG. 6 illustrate that when the axle 18a is fully inserted into the axle receptor, the protruding detent pins 20a and 20b lock the axle 18a onto the axle receptor 22. That is, the detent pins 20a and 20b engage with the interior edge of the axle receptor, and the axle cannot be pulled out of the axle receptor because the detent pins so prevent it.

Figure 7:
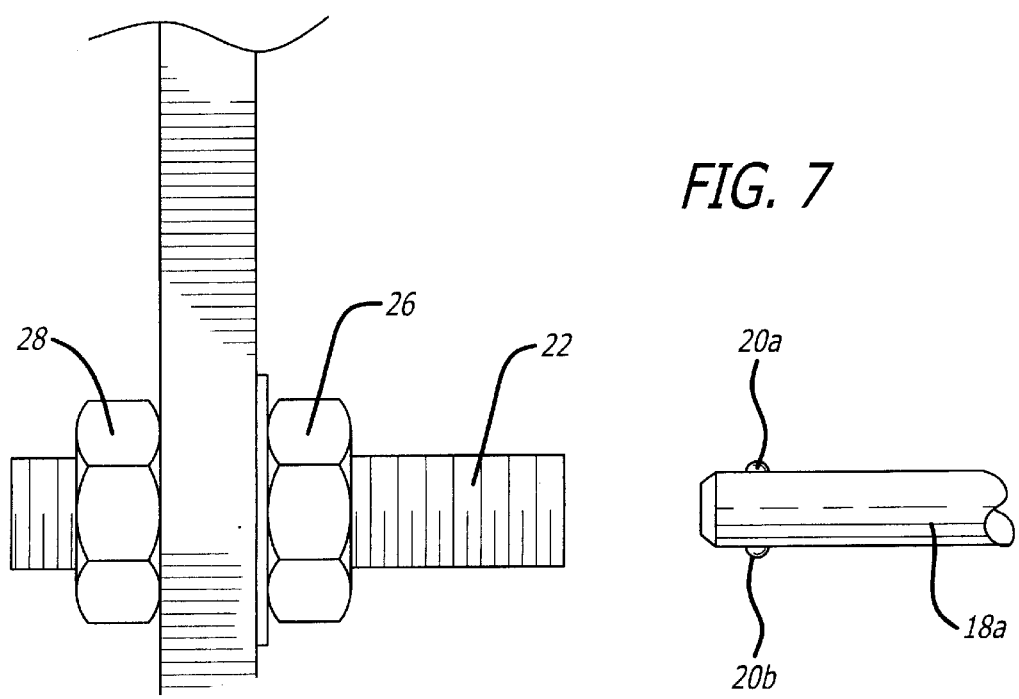
FIG. 7 illustrates the axle having been disengaged from the axle receptor.
Figure 8:
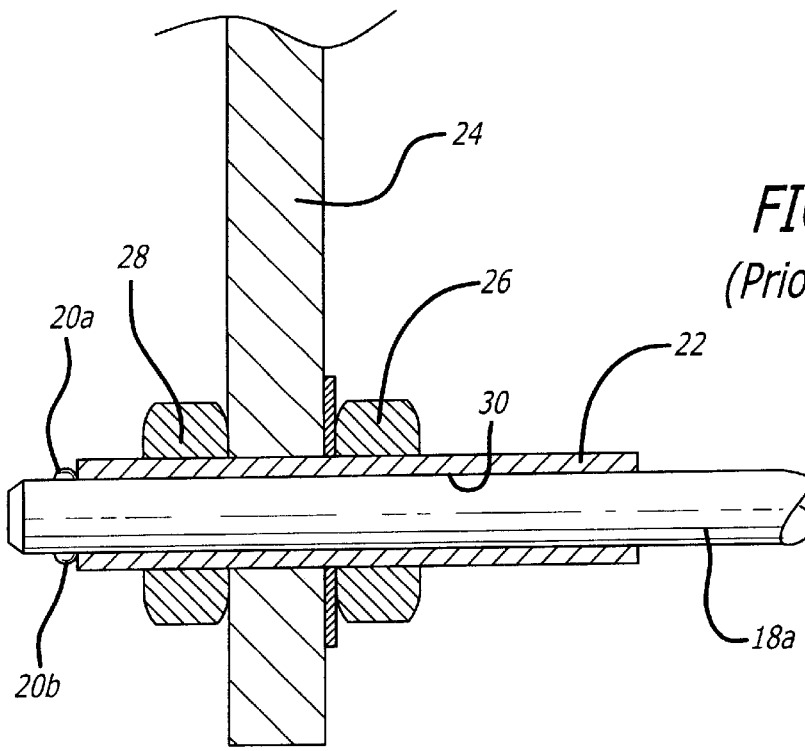
FIG. 8 is a cross-sectional view of a prior art axle receptor.

However, the user may depress the release button 16a (FIG. 2) to retract the detent pins 20a and 20b, and the axle 18a may then be removed from the axle receptor 22, as in FIG. 7. FIG. 8 illustrates the interior of a prior art axle receptor 22. Once the detent pins are retracted, there is nothing along the interior surface 30 of the axle receptor in which the spring-loaded detent pins can engage. The interior surface of the axle receptor is generally smooth and continuous, and the interior surface holds the detent pins in a retracted state as the axle is pulled from the axle receptor.

Figure 9:
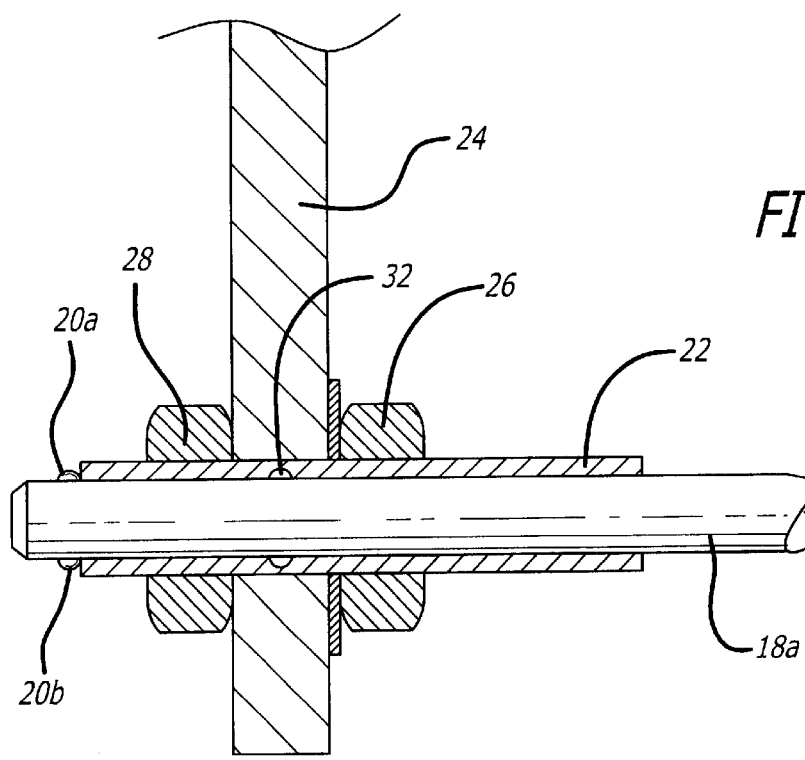
FIG. 9 is a cross-sectional view of an axle receptor according to the present invention, in which the axle receptor is provided with a channel on the interior surface of the receptor, intermediate between the two ends of the receptor, to provide an intermediate locked position for a wheel axle.
Figure 10:
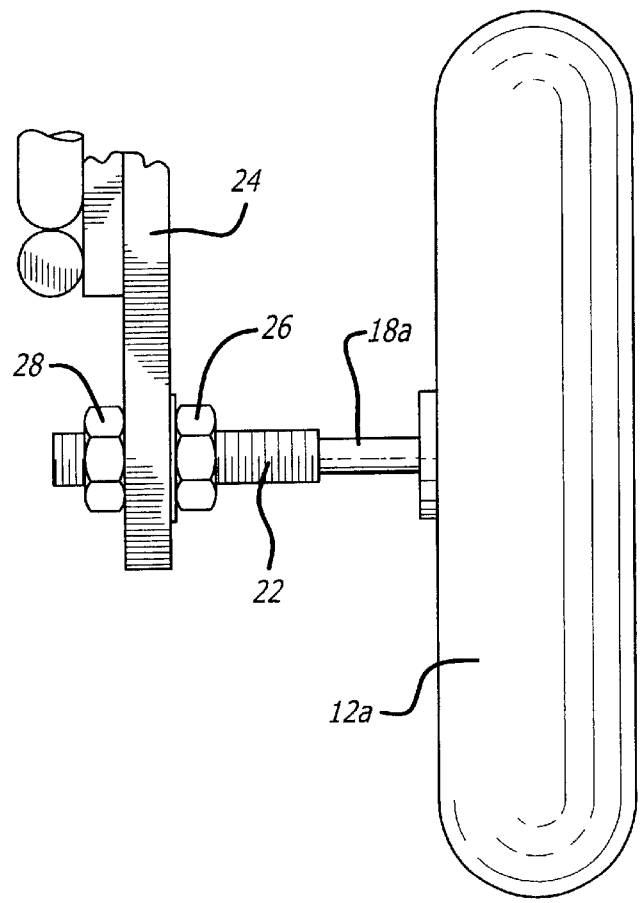
FIG. 10 illustrates a wheel locked into the intermediate locked position.

In the embodiment of the present invention illustrated in FIG. 9, however, the interior of the axle receptor is provided with a groove 32 into which the spring-loaded detent pins can engage. This groove provides an intermediate stop for the axle, such that the axle becomes locked to the axle receptor intermediate between the fully-locked position of FIG. 6 and the fully removed arrangement of FIG. 7. The groove extends around the interior perimeter of the axle receptor, although in alternative embodiments simple indentations or other engagement arrangements known in the art may be used instead of a groove. FIG. 10 illustrates the axle being locked into the intermediate stop.

Figure 11:
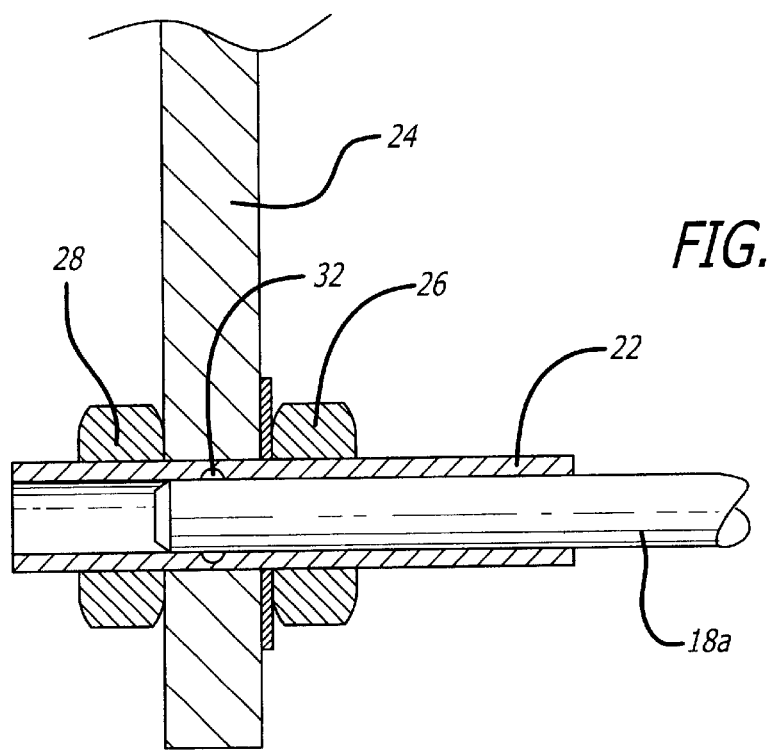
FIG. 11 is a cross-sectional view of the locked position of FIG. 10, with the ball bearings of the wheel axle being engaged with the channel on the interior surface of the receptor.

The intermediate stop 32 acts as a safety catch, in that if the release button is bumped inadvertently so that the detent pins retract and the axle begins to retract from the axle receptor, the detent pins will engage with the intermediate groove before the axle disengages from the axle receptor. Once the detent pins are engaged in the intermediate stop 32, the release button must be again pressed to release the axle from the intermediate locked position of FIG. 9. FIG. 11 illustrates the detent pins locked into the intermediate groove.

It should be noted that to remove the wheel from the axle receptor without the detent pins engaging at the intermediate stop, the user can continue to push the release button as the axle is removed from the axle receptor.

The foregoing has described a preferred embodiment of the present invention. However, it should be understood that various changes and modifications can be made within the scope of the invention. For example, other types of wheel locks known in the art may be used. The basic principle is to provide an intermediate locking position to prevent the wheel from disengaging from the wheelchair when the release button is accidentally bumped. This can be accomplished with various other locking schemes.

The preferred embodiment has a single intermediate locking position that is provided by the groove 32. However, more than one groove can be provided, so as to provide multiple intermediate stops. The locking system would then provide various locked positions. The user might use these various positions to adjust the position of the wheel relative to the frame, for example. That is, the user could engage the detent pins in one of the intermediate stops in order to space the wheel farther from the frame than normal.

Various other modifications can be readily made, and the present invention is not limited to any one particular embodiment.

We claim:

1. A wheel locking system, comprising:

a wheel having an axle;

an axle receptor to receive the axle;

when the axle is inserted into said axle receptor;

a first locked position in which the axle is fully engaged with the axle receptor, and a second locked position in which the axle is partially engaged with the axle receptor;

a protrusion which extends from the axle; and indentations formed in the axle receptor into which the protrusion extends when in the first or second locked positions wherein the protrusion is a ball bearing.

2. A wheel locking system, comprising:

a wheel having an axle;

an axle receptor to receive the axle;

when the axle is inserted into said axle receptor, a first locked position in which the axle is fully engaged with the axle receptor, and a second locked position in which the axle is partially engaged with the axle receptor;

a protrusion which extends from the axle; and indentations formed in the axle receptor into which the protrusion extends when in the first or second locked positions wherein the indentations are first and second annular grooves formed in the axle receptor so that the protrusion extends into the first annular groove when in the first locked position and into the second annular groove when in the second locked position.

3. A wheel locking system, comprising:

a wheel having an axle;

an axle receptor to receive the axle;

when the axle is inserted into said axle receptor;

a first locked position in which the axle is fully engaged with the axle receptor, and a second locked position in which the axle is partially engaged with the axle receptor, a protrusion which extends from the axle; and indentations formed in the axle receptor into which the protrusion extends when in the first or second locked position;

inner passage walls forming a cylindrical inner passage passing through the axle receptor for receiving the axle, the cylindrical inner passage having an axial direction along which the axle is directed;

and wherein:

the indentations are first and second annular grooves formed in the inner passage walls and spaced axially apart from one another; and wherein the protrusion extends into the first annular groove when in the first locked position and extends into the second annular groove when in the second locked position.

4. A method for preventing inadvertent full disengagement of a wheel from a wheelchair comprising the steps of:

inadvertently unlocking an axle of a wheel from a first fully engaged position relative to an axle receptor, locking the axle in a second partially engaged position relative to the axle receptor prior to the wheel becoming fully disengaged from the wheelchair thereby preventing the wheel from becoming fully disengaged from the wheelchair said step of locking including extending a protrusion from the axle into a first indentation formed in the axle receptor when the first fully engaged position relative to an axle receptor and extending the protrusion from the axle into a second indentation formed in the axle receptor when in the second locked position wherein the protrusion is a ball bearing.

5. A method for preventing inadvertent full disengagement of a wheel from a wheelchair comprising the steps of:

inadvertently unlocking an axle of a wheel from a first fully engaged position relative to an axle receptor, locking the axle in a second partially engaged position relative to the axle receptor prior to the wheel becoming fully disengaged from the wheelchair thereby preventing the wheel from becoming fully disengaged from the wheelchair said step of locking including extending a protrusion from the axle into a first indentation formed in the axle receptor when in the first fully engaged position relative to an axle receptor and extending the protrusion from the axle into a second indentation formed in the axle receptor when in the second locked position further comprising the steps of extending the indentation into a first annular groove formed in the axle receptor when the axle is locked in the first fully engaged position relative to the axle receptor and extending the indentation into a second annular groove formed in the axle receptor when the axle is locked in the second partial engaged position relative to the axle receptor.

6. A method for preventing inadvertent full disengagement of a wheel from a wheelchair comprising the steps of:

inadvertently unlocking an axle of a wheel from a first fully engaged position relative to an axle receptor;

locking the axle in a second partially engaged position relative to the axle receptor prior to the wheel becoming fully disengaged from the wheelchair thereby preventing the wheel from becoming fully disengaged from the wheelchair said step of locking including extending a protrusion from the axle into a first indentation formed in the axle receptor when in the first fully engaged position relative to an axle receptor and extending the protrusion from the axle into a second indentation formed in the axle receptor when in the second locked position; and further comprising the steps of:

receiving the axle within an inner passage wall forming a cylindrical inner passage passing through the axle receptor so that the axle is oriented along an axial direction of the cylindrical inner passage; and extending the protrusion into a first annular groove formed in the inner passage wall thereby locking the axle in the first fully engaged position relative to the axle receptor;

extending the protrusion into a second annular groove formed in the inner passage wall and spaced axially apart from the first annular grove thereby locking the axle in the second partially engaged position relative to the axle receptor.

\* \* \* \* \*